United States Patent
Cretors et al.

(10) Patent No.: US 10,631,562 B2
(45) Date of Patent: Apr. 28, 2020

(54) CONTINUOUS POPCORN MACHINES HAVING VARIABLE HEATING PROFILES AND ASSOCIATED SYSTEMS AND METHODS

(71) Applicant: C. Cretors & Company, Wood Dale, IL (US)

(72) Inventors: Charles D. Cretors, Lake Forest, IL (US); Nenad Vidojevic, Chesterton, IN (US)

(73) Assignee: C. Cretors & Company, Wood Dale, IL (US)

( * ) Notice: Subject to any disclaimer, the term of this patent is extended or adjusted under 35 U.S.C. 154(b) by 0 days.

(21) Appl. No.: 15/821,654

(22) Filed: Nov. 22, 2017

(65) Prior Publication Data

US 2018/0139989 A1 May 24, 2018

Related U.S. Application Data

(60) Provisional application No. 62/425,877, filed on Nov. 23, 2016.

(51) Int. Cl.
*A23L 7/161* (2016.01)
*A23L 5/10* (2016.01)
*A23L 7/183* (2016.01)

(52) U.S. Cl.
CPC .............. *A23L 7/161* (2016.08); *A23L 5/15* (2016.08); *A23L 7/183* (2016.08); *A23V 2002/00* (2013.01)

(58) Field of Classification Search
CPC ........ A23L 7/161; A23L 5/15; A23V 2002/00
(Continued)

(56) References Cited

U.S. PATENT DOCUMENTS

| 884,771 A | 4/1908 | Snow |
| 1,251,291 A | 12/1917 | Scheeffer |

(Continued)

FOREIGN PATENT DOCUMENTS

| CN | 203737561 | 7/2014 |
| DE | 8624682 | 12/1986 |

(Continued)

OTHER PUBLICATIONS

Cretors Coater Mixer Tumbler, http://www.cretors.com/store/catalog.asp?item=39&category_id=3, Copyright 2014, 1 page.
(Continued)

*Primary Examiner* — Thien S Tran
(74) *Attorney, Agent, or Firm* — Perkins Coie LLP (57) ABSTRACT

Popcorn machines having process chambers with variable heating profiles, and associated systems and methods of operation are disclosed herein. In one embodiment, a popcorn machine includes a tube having an upper tube portion and a lower tube portion. The upper tube portion and the lower tube portion form a circumferential boundary of a tubular process chamber for popping popcorn. A first heating element can be positioned to heat a first heating zone, and a second heating element can be positioned to heat a second heating zone. A first thermocouple can be positioned to measure a temperature at a transition point between the first heating zone and the second heating zone, and a second thermocouple can be positioned to measure a temperature in the second heating zone. A rotatable auger can be positioned at least partially within the tube to move ingredients through the process chamber.

12 Claims, 8 Drawing Sheets

(58) Field of Classification Search
USPC ........ 99/323.5, 323, 6, 323.7, 334; 426/389, 426/450
See application file for complete search history.

(56) References Cited

U.S. PATENT DOCUMENTS

| | | |
|---|---|---|
| 1,308,241 A | 7/1919 | Hutchinson |
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A | 4/1951 | Gibson |
| 2,570,126 A | 10/1951 | Hobbs |
| 2,575,643 A | 11/1951 | Tamsen |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,918,956 A | 12/1959 | Otto |
| 2,939,379 A | 6/1960 | Schmitt |
| 2,984,169 A | 5/1961 | Bushway |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,251,579 A | 5/1966 | Lasar |
| 3,280,720 A | 10/1966 | Kuhn |
| 3,291,304 A | 12/1966 | Fuchs |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,584,585 A | 6/1971 | Hansel et al. |
| 3,697,289 A | 10/1972 | Day et al. |
| 3,739,953 A | 6/1973 | Cretors |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | Vandewalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,417,505 A | 11/1983 | Pietrobelli |
| 4,438,682 A | 3/1984 | King et al. |
| 4,444,553 A * | 4/1984 | Christodoulou ........ A23F 5/046 432/134 |
| 4,494,314 A | 1/1985 | Gell, Jr. |
| 4,512,247 A | 4/1985 | Friedman |
| D285,404 S | 9/1986 | Wang |
| 4,648,719 A | 3/1987 | Roben et al. |
| 4,649,263 A | 3/1987 | Goodlaxson |
| 4,658,708 A | 4/1987 | Rastoin |
| 4,702,158 A | 10/1987 | Ishihara |
| D294,448 S | 3/1988 | Otto |
| 4,763,568 A | 8/1988 | Kiczek |
| 4,828,146 A | 5/1989 | Stein |
| 4,881,457 A | 11/1989 | Lyga et al. |
| 5,013,575 A | 5/1991 | Stadler et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,176,069 A | 1/1993 | Chen |
| 5,180,898 A | 1/1993 | Alden et al. |
| 5,203,256 A | 4/1993 | Mueller |
| 5,237,912 A | 8/1993 | Fins |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoeberigs |
| 5,332,102 A | 7/1994 | Sennett et al. |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,645,878 A | 7/1997 | Breslin et al. |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson et al. |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,857,403 A | 1/1999 | Mann |
| 5,871,792 A | 2/1999 | Weiss et al. |
| 5,890,033 A | 3/1999 | Parker |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |
| 6,234,063 B1 | 5/2001 | Evers et al. |
| 6,234,064 B1 | 5/2001 | Turrel |
| 6,331,323 B1 * | 12/2001 | Adler-Nissen ........ A47J 37/044 426/519 |
| 6,374,727 B1 | 4/2002 | Cretors |
| 6,382,087 B1 | 5/2002 | Iiyama |
| 6,412,395 B1 | 7/2002 | Weiss et al. |
| 6,412,396 B1 | 7/2002 | Wright |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |
| 6,619,280 B1 | 9/2003 | Zhou et al. |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B1 | 10/2007 | Allington et al. |
| 7,874,244 B1 | 1/2011 | Rhome |
| 8,011,622 B1 | 9/2011 | Guthrie |
| 8,201,492 B2 | 6/2012 | Cretors |
| D672,789 S | 12/2012 | Bongiovanni |
| 8,464,634 B2 | 6/2013 | Cretors et al. |

(56) References Cited

U.S. PATENT DOCUMENTS

| | | | |
|---|---|---|---|
| 8,651,014 | B2 | 2/2014 | Vidojevic et al. |
| 8,794,129 | B2 | 8/2014 | Cretors |
| 8,869,679 | B2 | 10/2014 | Ryan et al. |
| 8,887,626 | B2 | 11/2014 | Baker, Jr. |
| 9,144,247 | B2 | 9/2015 | Cretors |
| 9,198,532 | B2 | 12/2015 | Barrows et al. |
| 9,408,496 | B2 | 8/2016 | Cretors |
| D802,982 | S | 11/2017 | Vidojevic |
| 2002/0147006 | A1 | 10/2002 | Coon et al. |
| 2003/0159591 | A1 | 8/2003 | Evans et al. |
| 2003/0168438 | A1 | 9/2003 | Zhou |
| 2004/0045444 | A1 | 3/2004 | Mann |
| 2004/0045542 | A1 | 3/2004 | Zhou et al. |
| 2004/0074397 | A1 | 4/2004 | Calhoun |
| 2004/0265993 | A1 | 12/2004 | Darling et al. |
| 2005/0056154 | A1 | 3/2005 | Fu |
| 2005/0086814 | A1 | 4/2005 | Huang |
| 2006/0149415 | A1 | 7/2006 | Richards |
| 2009/0041915 | A1 | 2/2009 | Biechteler |
| 2009/0056558 | A1 | 3/2009 | Cretors et al. |
| 2009/0126579 | A1 | 5/2009 | Cretors et al. |
| 2009/0145242 | A1 | 6/2009 | Pryor, Jr. et al. |
| 2009/0208621 | A1 | 8/2009 | Dotan |
| 2009/0223378 | A1 | 9/2009 | Cretors |
| 2010/0270282 | A1 | 10/2010 | Fernandez et al. |
| 2011/0014340 | A1 | 1/2011 | Spitzley et al. |
| 2011/0027434 | A1 | 2/2011 | Cretors et al. |
| 2011/0076372 | A1 | 3/2011 | Cretors |
| 2011/0076373 | A1* | 3/2011 | Cretors ............... A23P 30/38 426/450 |
| 2011/0120317 | A1 | 5/2011 | Rhome |
| 2011/0274804 | A1 | 11/2011 | Barrows et al. |
| 2012/0266756 | A1 | 10/2012 | Cretors |
| 2013/0022727 | A1 | 1/2013 | Sherwin |
| 2013/0276640 | A1 | 10/2013 | Cretors |
| 2013/0276641 | A1 | 10/2013 | Vidojevic |
| 2013/0280386 | A1 | 10/2013 | Cretors |
| 2013/0298781 | A1 | 11/2013 | Ganuza et al. |
| 2014/0311356 | A1 | 10/2014 | Daniels |
| 2015/0064320 | A1 | 3/2015 | Cretors |
| 2017/0290360 | A1 | 10/2017 | Vidojevic |

FOREIGN PATENT DOCUMENTS

| | | |
|---|---|---|
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co., "Funfood Equipment & Supplies" catalog; vol. 56, dated 2000, 108 pages.

Loeb Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

"How to Succeed in the Caramel Corn Business," Gold Medal Products Company, Copyright 2011, gmpopcorn.com, 24 pages.

"Induceramic, infrared honeycomb ceramic burner plate, using Wayback Machine," retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014), 4 pages.

Platvoet et al., "Process Burner 101," American Institute of Chemical Engineers; Retrieved on Aug. 19, 2019 from https://www.aiche.org/sites/default/files/cep/20130835.pdf Copyright 2013 (Year: 2013), 5 pages.

* cited by examiner

CONTINUOUS POPCORN MACHINES HAVING VARIABLE HEATING PROFILES AND ASSOCIATED SYSTEMS AND METHODS

CROSS-REFERENCE TO RELATED APPLICATION

This application claims priority to U.S. Provisional Patent Application No. 62/425,877, entitled "CONTINUOUS POPCORN MACHINES HAVING VARIABLE HEATING PROFILES AND ASSOCIATED SYSTEMS AND METHODS," filed Nov. 23, 2016, which is incorporated herein by reference in its entirety.

TECHNICAL FIELD

The following disclosure relates generally to popcorn machines and, more particularly, to popcorn machines having process chambers with variable heating profiles, and associated systems and methods.

BACKGROUND

In typical popcorn machines designed for commercial popcorn production, thermostats are used to control the popping cycles of high output kettles. More particularly, feedback from the thermocouples is used to control heating elements and heat the kettles and corn kernels therein at rates that prevent burning and yet ensure that the corn kernels pop. The controlled cooking cycle in these high output kettles can produce consistent and high-quality popcorn. In previous designs of continuous popcorn machines, attempts to produce popcorn of similar quality have been unsuccessful.

In kettle-based popcorn machines, various flavorings and coatings can be added to the kettle to produce flavored or coated popcorn (e.g., kettle corn). However, in popcorn machines employing rotating mesh drums or other flow-through or continuous popping systems (e.g., auger driven popcorn machines), flavorings or coatings typically must be added after the popping process is completed and the popcorn has been removed from the popping container. In particular, flavorings or sugar coatings added to machines employing mesh drums or existing auger driven systems can result in accumulation of the ingredients within the drum, auger, or associated components that prevents proper operation of the machine. For example, sticky flavorings can accumulate in components of these machines and, absent time consuming and costly cleaning, prevent rotation of the components or significantly reduce heat transfer between heating elements of the machine and the ingredients.

DETAILED DESCRIPTION

The following disclosure describes various embodiments of popcorn machines having process chambers with variable heating profiles, and associated systems and methods. In some embodiments, a popcorn machine configured in accordance with the present technology includes a tube extending along a longitudinal axis and having an upper tube portion and a lower tube portion. The upper tube portion and the lower tube portion form a circumferential boundary of a tubular process chamber for popping popcorn. A first heating element can be positioned to heat a first heating zone, and a second heating element can be positioned to heat a second heating zone. Additionally, a first thermocouple can be positioned to measure a temperature at a transition point between the first heating zone and the second heating zone, and a second thermocouple can be positioned to measure a temperature in the second heating zone. A rotatable auger is positioned at least partially within the tube to move ingredients through the process chamber. Although several embodiments can include all of these features, other embodiments may eliminate particular features, components and/or procedures. A person of ordinary skill in the relevant art, therefore, will understand that the present technology, which includes associated devices, systems, and procedures, may include other embodiments with additional elements or steps, and/or may include other embodiments without several of the features or steps shown and described below with reference to FIGS. 1-7.

As discussed above, many existing popcorn machines do not provide for the efficient production of coated or flavored popcorn, and existing continuous or flow-through popcorn machines do produce consistent, high-quality popcorn. The present technology includes several embodiments of popcorn machines and associated systems and methods that have process chambers with variable heating profiles that can pop consistent, high-quality popcorn and coat the popcorn. Certain details are set forth in the following description and FIGS. 1-7 to provide a thorough understanding of various embodiments of the disclosure. To avoid unnecessarily obscuring the description of the various embodiments of the disclosure, other details describing well-known structures and systems often associated with popcorn machines, augers, popping chambers, heating devices, and the components or devices associated with the manufacture of conventional popcorn machines or augers are not set forth below. Moreover, many of the details and features shown in the Figures are merely illustrative of particular embodiments of the disclosure. Accordingly, other embodiments can have other details and features without departing from the spirit and scope of the present disclosure. In addition, the various elements and features illustrated in the Figures may not be drawn to scale. Furthermore, various embodiments of the disclosure can include structures other than those illustrated in the Figures and are expressly not limited to the structures shown in the Figures.

Figure 1:
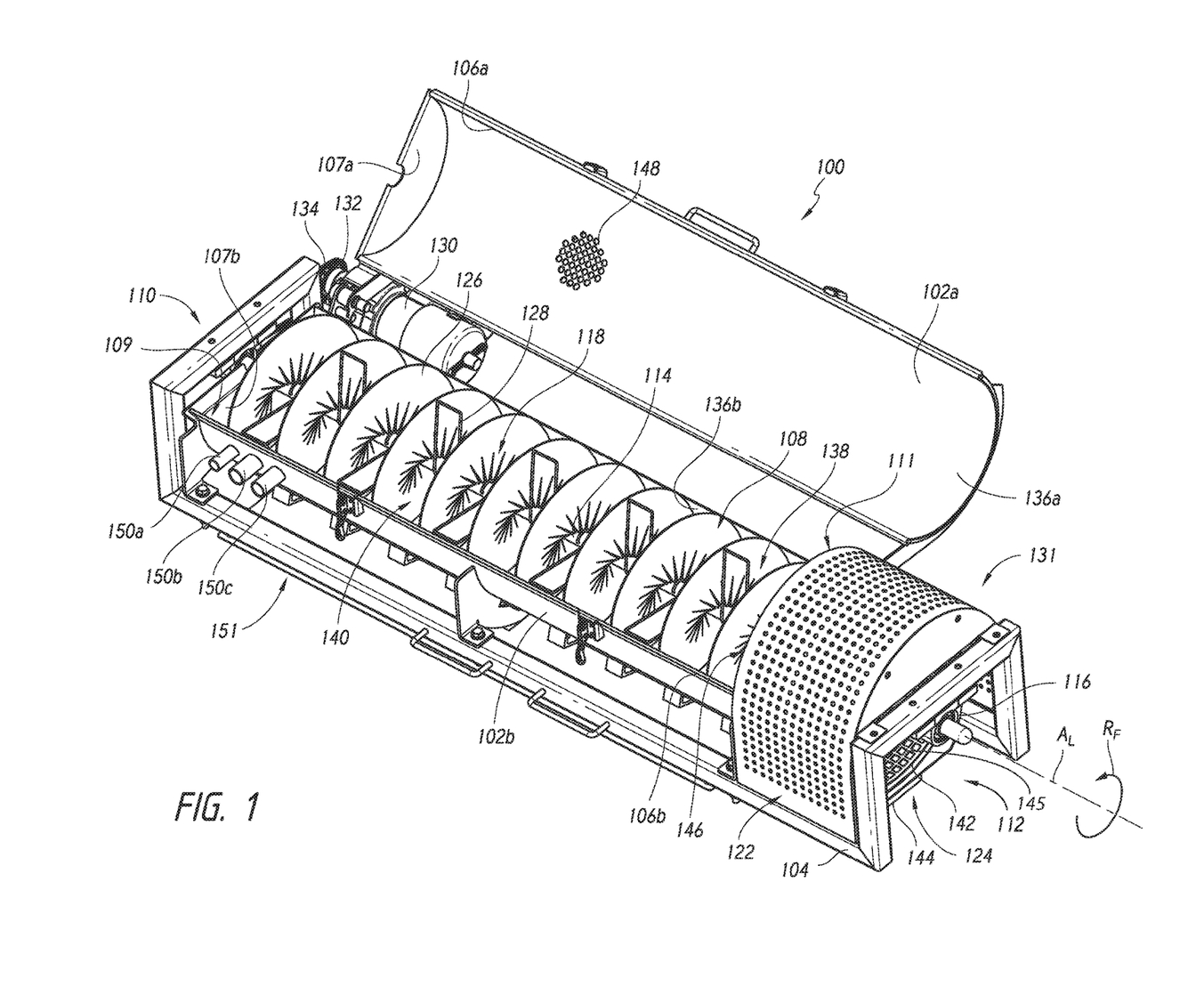
FIG. 1 is an isometric view of a popcorn machine configured in accordance with an embodiment of the present technology.

FIG. 1 is an isometric view of a popcorn machine 100 configured in accordance with an embodiment of the present technology. In the illustrated embodiment, the popcorn machine 100 includes a housing 102 having an upper housing portion 102a that is hingeably connected to a lower housing portion 102b. The popcorn machine 100 also includes a frame 104 that supports the housing 102. The upper housing portion 102a is rotatable from an open position in which a first sealing surface 106a is spaced apart from a second sealing surface 106b (as shown in FIG. 1), to a closed position in which the sealing surfaces 106 contact each other. The upper housing portion 102a includes an upper first end wall 107a and the lower housing portion 102b includes a lower first end wall 107b. In the closed position, the upper first end wall 107a and the lower first end wall 107b are brought together to form a first end wall 107.

An auger 108 can extend along a longitudinal axis $A_L$ from a first end 110 of the popcorn machine 100, through the first end wall 107, to a second end 112. The auger 108 includes a shaft 114 that is rotatably supported on opposite ends by one or more bearing assemblies 116. The auger 108 includes a central portion 118 extending between the first end wall 107 and a sifting and cooling assembly 122 having an outlet 124. The auger 108 can also include one or more flights 126 that extend around the shaft 114 in a corkscrew (e.g., helical) pattern along the central portion 118. In the illustrated embodiment, the auger 108 includes one continuous flight 126 that extends around and along the auger 108. In other embodiments, augers can include two or more flights that extend along the associated auger. The auger 108 can also include one or more scraping wires 128 extending from the shaft 114. A motor 130 (e.g., an electrically driven servo motor) can be positioned on a rear side 131 of the popcorn machine 100 and connected to the shaft 114 via one or more sprockets 132 and a chain 134.

The upper housing portion 102a includes an upper tube portion 136a, and the lower housing portion 102b includes a lower tube portion 136b. Together, the upper tube portion 136a and the lower tube portion 136b form a circumferential boundary of a tubular popping chamber or process chamber 138. In particular, when the upper housing portion 102a is in a closed position, the first and second sealing surfaces 106a and 106b are brought together and the upper and lower tube portions 136a and 136b form a tube 136 having a first end 109 and a second end 111. The tube 136 extends around the auger 108, at least partially forming the process chamber 138 that extends between the first end wall 107 and the sifting and cooling assembly 122. As used herein, the term "process chamber" can refer to a chamber in which popcorn popping operations, cooking operations, and/or coating operations are performed. For example, as described in more detail below, the popcorn machine 100 can pop popcorn and coat popcorn with sugar, salt, and/or other ingredients or flavorings, all within the process chamber 138.

With the upper housing portion 102a in a closed position, the flight 126 is positioned adjacent to the tube 136, thereby forming a channel 140 within the popping chamber 115. More specifically, the channel 140 is a volume that extends around the auger 108 in a helical or spiral path, and is at least partially bounded by adjacent portions of the flight 126, by the surface of the shaft 114, and/or by the inner walls of the tube 136. Rotation of the auger 108 can move popcorn and/or other ingredients along the channel 140 and through the process chamber 138. That is, the motor 130 can rotate the auger 108 to drive unpopped corn kernels, popcorn, cooking oil, sugar, salt, flavorings, and/or other ingredients placed in the tube 136 from the first end 110 of the popcorn machine 100 toward the second end 112, as discussed in more detail below.

The sifting and cooling assembly 122 includes a drum 142 and a removable tray 144. The drum 142 includes a grated surface 145 and is coupled to, and rotates with, the shaft 114. The tube 136 extends from the first end wall 107 to an opening 146 adjacent the drum 142. As described in more detail below, popcorn and/or other ingredients that are processed in the process chamber 138 can be moved through the channel 140 and into the drum 142. The drum 142 can rotate with the shaft 114 and sift out unpopped corn kernels, which pass through the grated surface 145 into the removable tray 144. A receiving chute or receptacle can be positioned adjacent the outlet 124 to receive product (e.g., popcorn, caramel corn, etc.) from the drum 142.

The upper housing portion 102a can include an exhaust outlet 148, and the lower housing portion 102b can include a plurality of feed tubes 150 (identified individually as a first feed tube 150a, a second feed tube 150b, and a third feed tube 150c). The exhaust outlet 148 is positioned to provide an exit path for steam, gases, particulates and/or other by-products produced within the process chamber 138 during popping and/or coating operations (i.e., process emissions). The feed tubes 150 can be positioned on a front side 151 of the popcorn machine 100 and extend through openings in the lower housing portion 102b to deliver ingredients (e.g., oil, popcorn kernels, sugar, flavoring, etc.) to the process chamber 138, as described in more detail below.

Figure 2A:
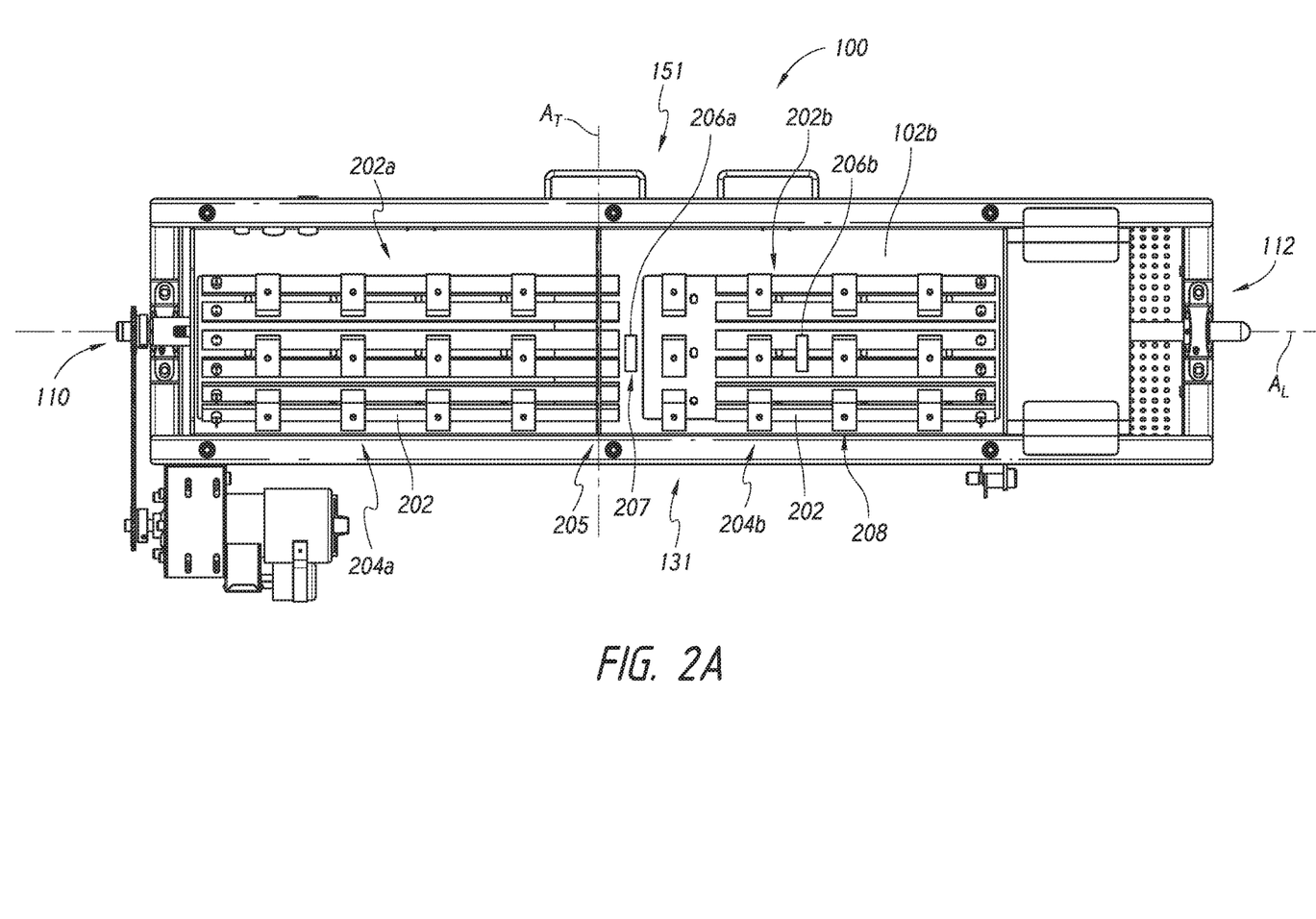
FIGS. 2A and 2B are bottom and end views, respectively, of the popcorn machine of FIG. 1.
Figure 2B:
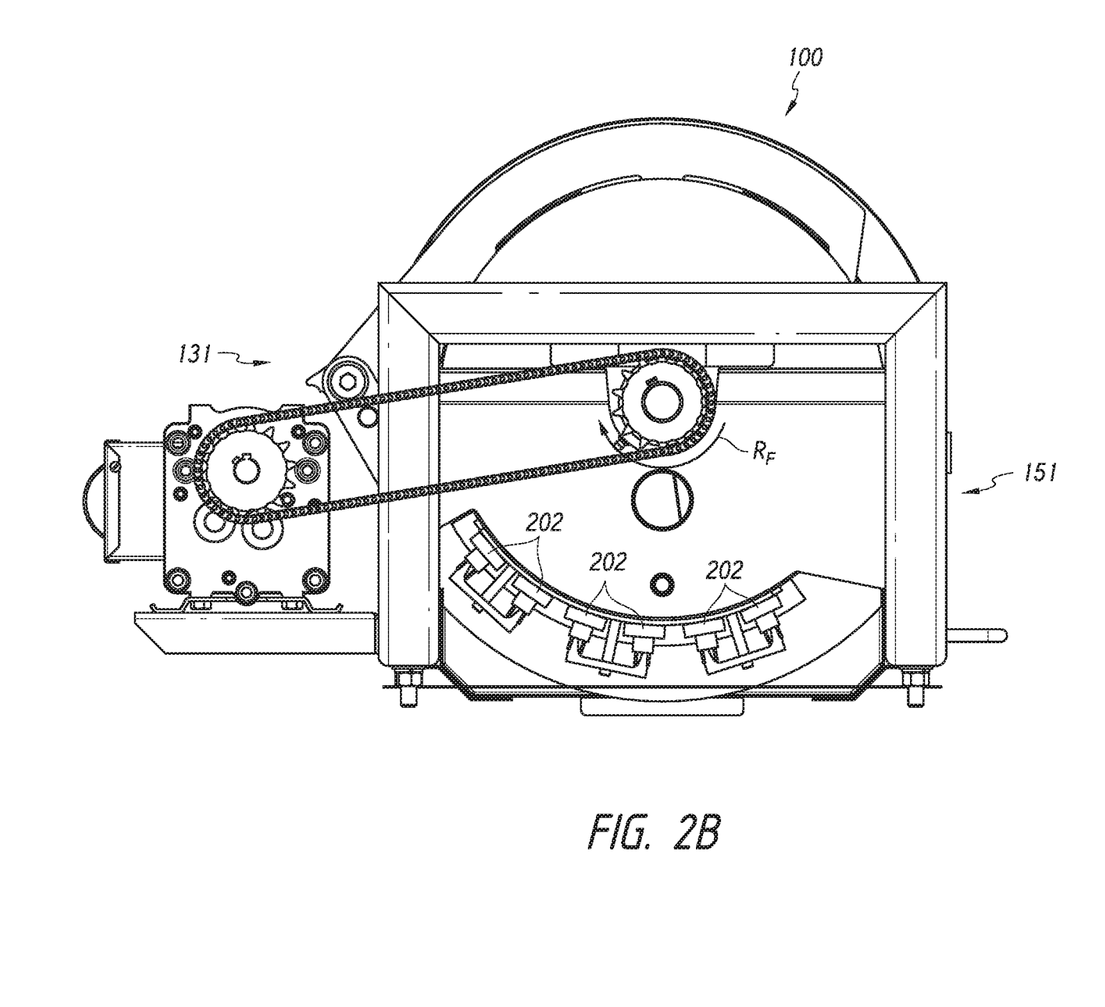

FIGS. 2A and 2B are bottom and end views, respectively, of the popcorn machine 100 configured in accordance with an embodiment of the present technology. Referring to FIGS. 2A and 2B together, a plurality of heating elements 202 (e.g., electrically powered resistive heating elements) can be attached to the lower housing portion 102b to heat the process chamber 138. More specifically, a first plurality of heating elements 202a are fixedly attached to the lower housing portion 102b in a first heating zone 204a along the longitudinal axis $A_L$, and a second plurality of heating elements 202b is attached to the lower housing portion 102b in a second heating zone 204b along the longitudinal axis $A_L$. The heating zones 204 can provide differential heating along the longitudinal axis $A_L$, as discussed in more detail below. In the illustrated embodiment of FIG. 2A, the first heating zone 204a can occupy a majority of the lower housing portion 102b, and extend past a midpoint 205 thereof. In other embodiments, the first heating zone 204a and the second heating zone 204b can occupy equal sized portions of the lower housing portion 102b. Additionally, other embodiments can include one heating zone, three or more heating zones, and/or heating elements that are mounted in other arrangements (e.g., one or more heating elements extending between heating zones, or heating elements arranged in configurations or patterns that do not correspond to any heating zone).

In addition to the heating zones 204 that are positioned to provide differential heating along the longitudinal axis $A_L$, the heating elements 202 can be positioned to provide differential heating with respect to a transverse axis $A_T$. In the illustrated embodiment of FIGS. 2A and 2B, for example, the heating elements 202 can be differentially positioned toward the rear side 131. As discussed in more detail below, the differential positioning of the heating elements 202 with respect to the transverse axis $A_T$ can provide differential heating that increases the efficiency of the popcorn machine 100. A first thermocouple 206a and a second thermocouple 206b can be positioned along the lower housing portion 102b of the housing 102 and or within the process chamber 138 to monitor a temperature therein. In the illustrated embodiment, the first thermocouple 206a is positioned proximate the midpoint 205, and the second thermocouple 206b is positioned within the second heating zone 204b. More specifically, the first thermocouple 206a is positioned at or proximate to a transition point 207 between the first heating zone 204a and the second heating zone 204b, and the second thermocouple 206b is positioned near a midpoint 208 of the second heating zone 204b. In other embodiments, the thermocouples 206 and/or additional thermocouples can be positioned at the midpoint 205 of the housing 102, at or proximate the first end 110 or the second end 112, and/or at other locations along the housing 102 or within the process chamber 138. For example, in some embodiments a thermocouple can be positioned at a midpoint of the first heating zone 204a.

Figure 3:
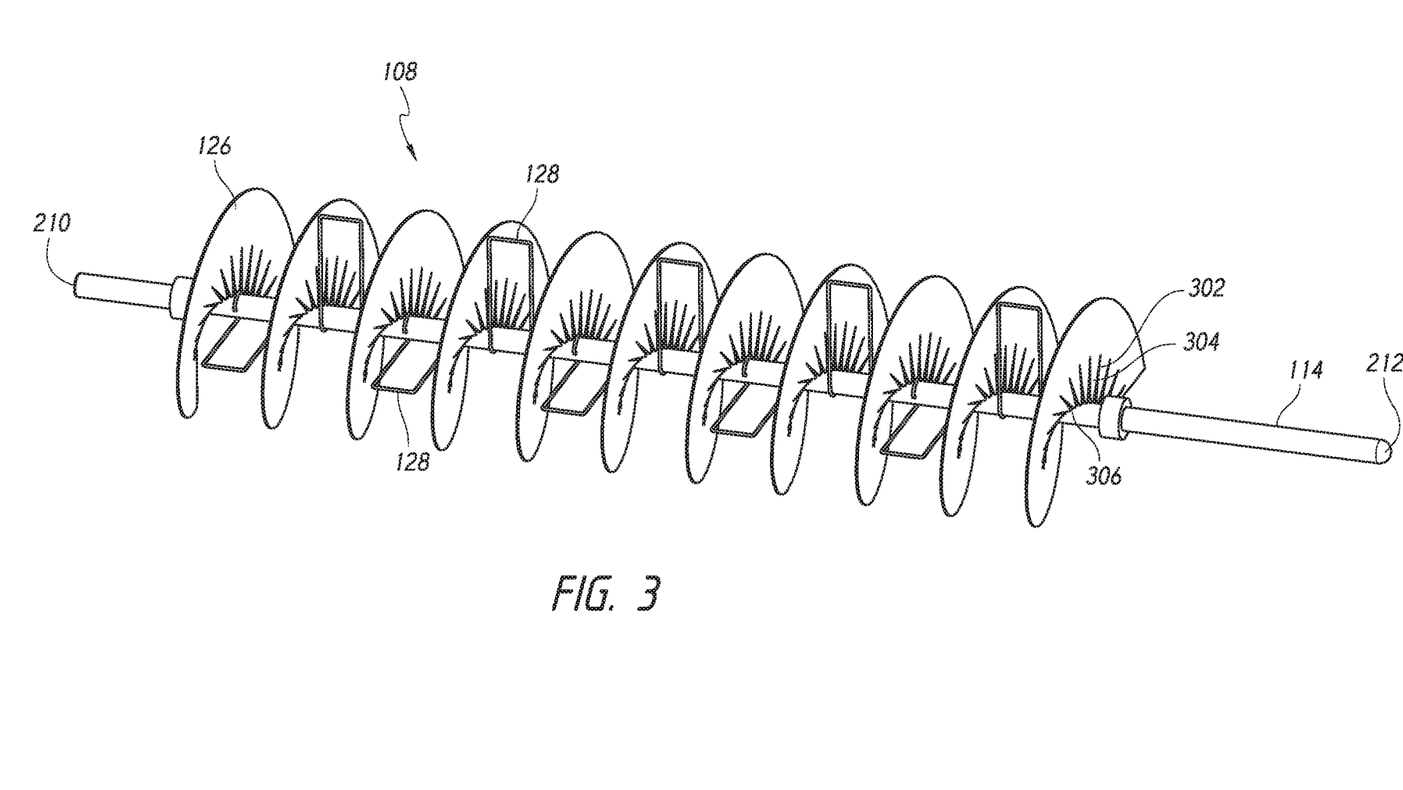
FIG. 3 is an isometric view of an auger configured in accordance with an embodiment of the present technology.

FIG. 3 is an isometric view of the auger 108 configured in accordance with an embodiment of the present technology. In the illustrated embodiment, the flight 126 includes a plurality of slot shaped openings 302. The flight 126 also includes a plurality of wedge shaped fingers 304 separated by the openings 302, and a central hole 306. The fingers 304 can extend around the shaft 114 in a helical pattern from a first end 210 of the shaft 114 to a second end 212. One or more of the fingers 304 on opposing ends of the flight 126 can be fixedly fastened to the shaft 114 to secure the flight 126 thereto.

In several embodiments, the auger 108 can be made from metal or metal alloys (e.g., stainless steel). The auger 108 can be constructed via a variety of fabrication methods known in the art, including casting, cutting, rolling, bending, welding, etc. For example, the shaft 114 can be a seamless stainless steel pipe that is formed via a continuous mandrel mill rolling processes, or a welded stainless steel pipe formed via an electric weld pipe mill. The flight 126 can be formed from a coiled stainless steel blank that is cut and drilled to form the openings 302 and the central hole 306, then stretched to match a length of the shaft 114. The shaft 114 can then be positioned to extend through the central hole 306, and one or more of the fingers 304 can be welded to the shaft 114.

Figure 4A:
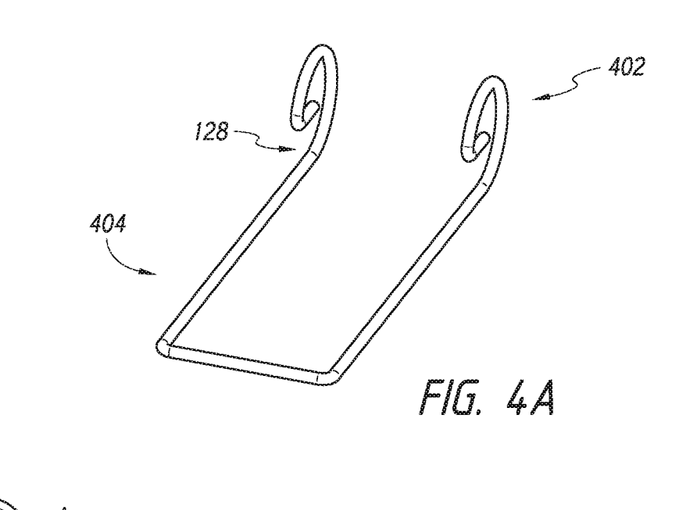
FIGS. 4A and 4B are top and end views, respectively, of a scraping wire configured in accordance with an embodiment of the present technology.
Figure 4B:
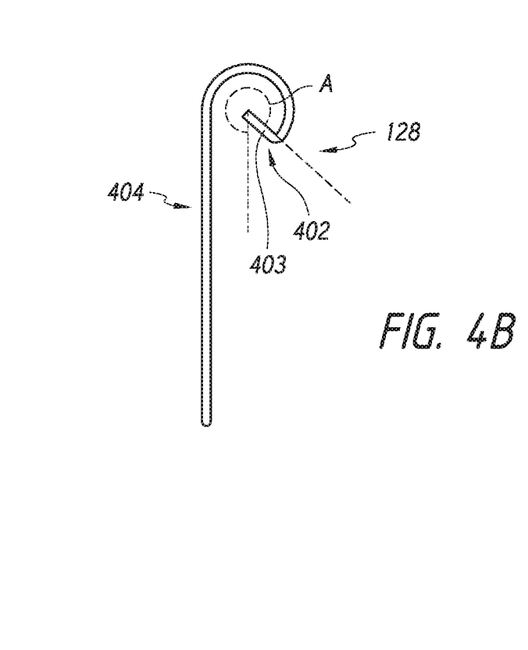
Figure 4C:
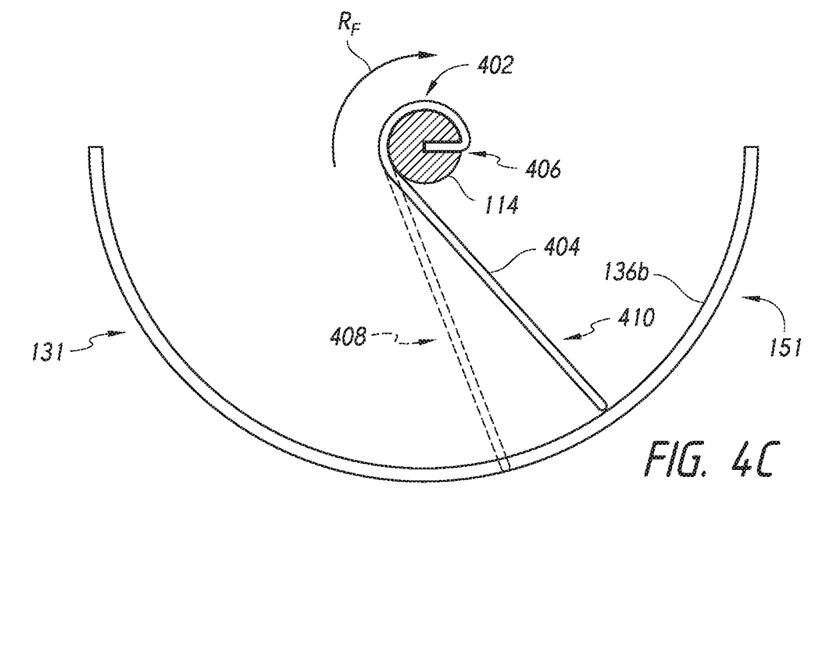
FIG. 4C is an end view of the scraping wire of FIGS. 4A and 4B engaged with a shaft.

FIGS. 4A and 4B are top and end views, respectively, of the scraping wire 128 configured in accordance with an embodiment of the present technology, and FIG. 4C is an end view of the scraping wire 128 engaged with the shaft 114. In the illustrated embodiment of FIGS. 4A-4C, the scraping wire 128 includes a first portion 402 and a second portion 404. A distal end 403 of the first portion 402 can be inserted into an opening 406 in the shaft 114, and the remainder of the first portion 402 can extend at least partially around the shaft 114. The distal end 403 of the first portion 402 extends along a path that is at an angle A with respect to the second portion 404. The angle A is greater than 270 degrees (e.g., 300 degrees) such that the first portion wraps around a significant portion of the shaft 114 to secure the scraping wire 128 to the shaft 114. The second portion 404 can extend away from the shaft 114 toward the tube 136 (e.g., toward the lower tube portion 136b shown in FIG. 4C). In a relaxed state, the scraping wire 128 would extend to a first position 408 shown in FIG. 4C. However, the tube 136 forces the scraping wire 128 into a "flexed" state, with the second portion 404 held in tension against the tube 136 at a second position 410. In the flexed state, the scraping wire 128 exerts a force against the tube 136.

Referring to FIGS. 1-4C together, in operation the heating elements 202 can be energized to provide heat to the lower tube portion 136b and heat the process chamber 138. The motor 130 can be energized to rotate the auger 108 in a direction $R_F$ (FIG. 1), and unpopped corn kernels and other ingredients (e.g., melted sugar) can be added to the process chamber 138 via the feed tubes 150 (FIG. 1) and/or via other inlets or openings into the process chamber 138. The heating of the tube 136 heats the process chamber 138 and the ingredients therein. As the auger 108 rotates in the direction $R_F$, the flight 126 moves the ingredients along the lower tube portion 136b from the first end 110 toward the second end 112. With the upper housing portion 102a in a closed position, the process chamber 138 can retain significant amounts of heat. As the ingredients move along the lower tube portion 136b within the process chamber 138, heat is transmitted to the ingredients via the lower tube portion 136b and the heated air within the process chamber 138, thereby increasing the temperature of the ingredients.

When the heating process raises the internal temperature of popcorn kernels within the process chamber 138 to approximately 350 degrees Fahrenheit, the popcorn kernels pop and expand in volume. A variety of factors can influence the location along the tube 136 at which the popcorn kernels reach popping temperature. For example, the rate of rotation of the auger 108, the angle of the flight 126 with respect to the shaft 114, the electrical current delivered to the heating elements 202, the positioning and efficiency of the heating elements 202, the dimensions of the tube 136, and/or a variety of other factors. As the ingredients move along the lower tube portion 136b and through the process chamber 138, some of the popcorn kernels begin to pop, causing expansion of the ingredients and the release of steam and heated gases. In several embodiments, heated gases and vapor in the process chamber 138 can pass through the slots and the openings in the flight 126, helping to spread heat through the process chamber 138.

As the ingredients move through the process chamber 138, more of the kernels reach their popping temperature and pop. Prior to reaching the opening 146, a majority of the popcorn kernels have popped and expanded. As the auger 108 continues to turn, the flight 126 moves the popped popcorn through the opening 146 and into the drum 142. The drum 142 rotates with the shaft 114 and causes unpopped corn kernels within the drum 142 to fall through the grated surface 145 and into the removable tray 144. Continued rotation of the auger 108 pushes more popcorn into the drum 142, driving some of the popcorn out of the drum 142 via the outlet 124.

In the illustrated embodiment of FIG. 1, oil, corn kernels, sugar and/or salt are added to the process chamber 138 at the first end 110 of the popcorn machine 100. Specifically, oil can be added via the first feed tube 150a, corn kernels can be added via the second feed tube 150b, and sugar and/or salt can be added via the third feed tube 150c. Rotation of the scraping wires 128 can scrape the tube 136 to help dislodge any ingredients that may adhere to the tube 136. For example, the scraping wires 128 can scrape hardened sugar or other ingredients off of the tube 136. The scraping wires 128 can thereby perform "self-cleaning" of the popcorn machine 100 via scraping action against the tube 136.

As discussed above, rotation of the flight 126 can drive ingredients through the process chamber 138 from the first end 110 toward the second end 112. Rotation of the flight 126 can also move ingredients toward the rear side 131 of the popcorn machine. Specifically, while the shaft 114 rotates in the forward direction $R_F$, the portions of the flight 126 adjacent the lower tube portion 136b move in a direction toward the rear side 131. The motion of the flight 126 can thereby push ingredients in the lower tube portion 136b toward the rear side 131. Additionally, the rotation of the scraping wires 128 can also move ingredients toward the rear side 131 of the popcorn machine 100. The combined effect of the rotation of the flight 126 and the scraping wires 128 can produce a differential distribution of the ingredients within the lower tube portion 136b, with a greater proportion distributed toward the rear side 131. As discussed above, the heating elements 202 can be positioned to direct more heat toward the rear side 131 than the front side 151. The positioning of the heating elements 202 toward the rear side 131 can provide more direct heating of the ingredients (e.g., corn kernels) that are distributed disproportionally toward the rear side 131 within the process chamber 138. Such positioning can thereby reduce the amount of energy required to pop the popcorn, increasing the efficiency of the popcorn machine 100 and lowering the operating costs.

Popcorn kernels contain about 14% water and significant amounts of starch. The water and starch are contained within cells of the kernels that are themselves contained within a husk. When the kernels are heated, the water is converted to steam and the starch becomes gelatinized. The steam builds pressure within the kernel, and at about 130 pounds per square inch of pressure, the husk of the kernel ruptures. Upon rupture, the pressure on the gelatinized starch is reduced to zero and the steam expands the cells to about 40 times their original size. The abrupt drop in pressure is accompanied by a corresponding drop in temperature converts the gelatinized starch to a crisp open cell foam. To produce quality popcorn, the kernels must be heated at a rate that is slow enough to gelatinize the starch within the kernel all the way to the core. However, the heating rate cannot be so slow that steam escapes from the husk and does not build enough pressure to pop the kernel.

In typical high output kettles for commercial popcorn production, thermostats are used to control the operation of heating elements during popping cycles. During typical popping operations with such machines, the temperature is generally maintained near a popping temperature of approximately 410 degrees Fahrenheit. At the beginning of a popping cycle, the addition of popcorn kernels causes the temperature to drop. The heating elements are energized (or remain energized) to slowly increase the temperature over the popping cycle and slowly raise the temperature of the corn kernels. At the end of the popping cycle, the ingredients are dumped from the kettle, and the popping cycle is repeated. The energy output of the heating elements in typical high output kettles is matched to the kettle size. More particularly, the heating elements are selected to provide heating at a rate that properly heats and pops a given volume of popcorn in repeated cycles with the heating elements energized continuously. To prevent heating the popcorn too quickly and/or burning the popcorn, a signal from the thermostat can be used to deenergize the heating elements if the temperature exceeds an operational limit. This can happen, for example, if an operator places less than a standard volume of popcorn kernels in the kettle. If the temperature of the kettle exceeds the operational limit, e.g., 430 degrees Fahrenheit, a signal from the thermostat de-energizes the heating elements. Some kettles include an additional setpoint (such as a safety limit) at a higher temperature (e.g., 450 degrees Fahrenheit). If the heating elements fail to de-energize at the operating limit, the thermostat can initiate de-energization of the heating elements based on the safety limit. The controlled popping cycle in these high output kettles can produce consistent and high-quality popcorn.

In previous designs, flow-through or continuous popcorn poppers have been constructed to replicate the cooking cycle of high output kettles. In such continuous poppers, popcorn and oil are typically introduced at one end of a trough, and an auger moves corn kernels and oil along the length of the trough. In attempts to achieve the quality of the kettle based machines, these earlier continuous machines were designed to have temperatures at an input end of the trough that is close to or matched to that of the kettle based machines. In particular, these previous designs generally included a thermocouple positioned near the inlet end of the machines, and heating was adjusted to maintain the temperature at the inlet end at or near the maximum temperature of the kettle based machines (e.g., approximately 410 degrees Fahrenheit). These prior machines had heating elements along the trough that added consistent amounts of heat as the kernels advanced down the machine. When the temperature at the inlet end was maintained at the desired maximum temperature, the slow addition of popcorn in these continuous machines did not cause any significant drop in temperature at the inlet end. As a result, popcorn usually popped too quickly, producing burned popcorn and/or fires. When the temperature at the inlet end was reduced, however, the popcorn did not reach the popping temperature quickly enough to pop.

Embodiments configured in accordance with the present technology can include thermocouples positioned at or proximate to the midpoint 205 of the tube 136 or the process chamber 138. As shown in FIG. 2A, for example, the first thermocouple 206a is positioned between the first heating zone 204a and the second heating zone 204b, and between the midpoint 205 of the tube 136 and two thirds of the distance from the lower first end wall 107b of the tube 136 to the opening 146 (FIG. 1). With the first thermocouple 206a positioned proximate to the midpoint 205 (e.g., at the transition point 207), the heating profile of the popcorn machine 100 can be adjusted to be at least generally similar to those of typical high output kettles, as discussed in more detail below.

Figure 5:
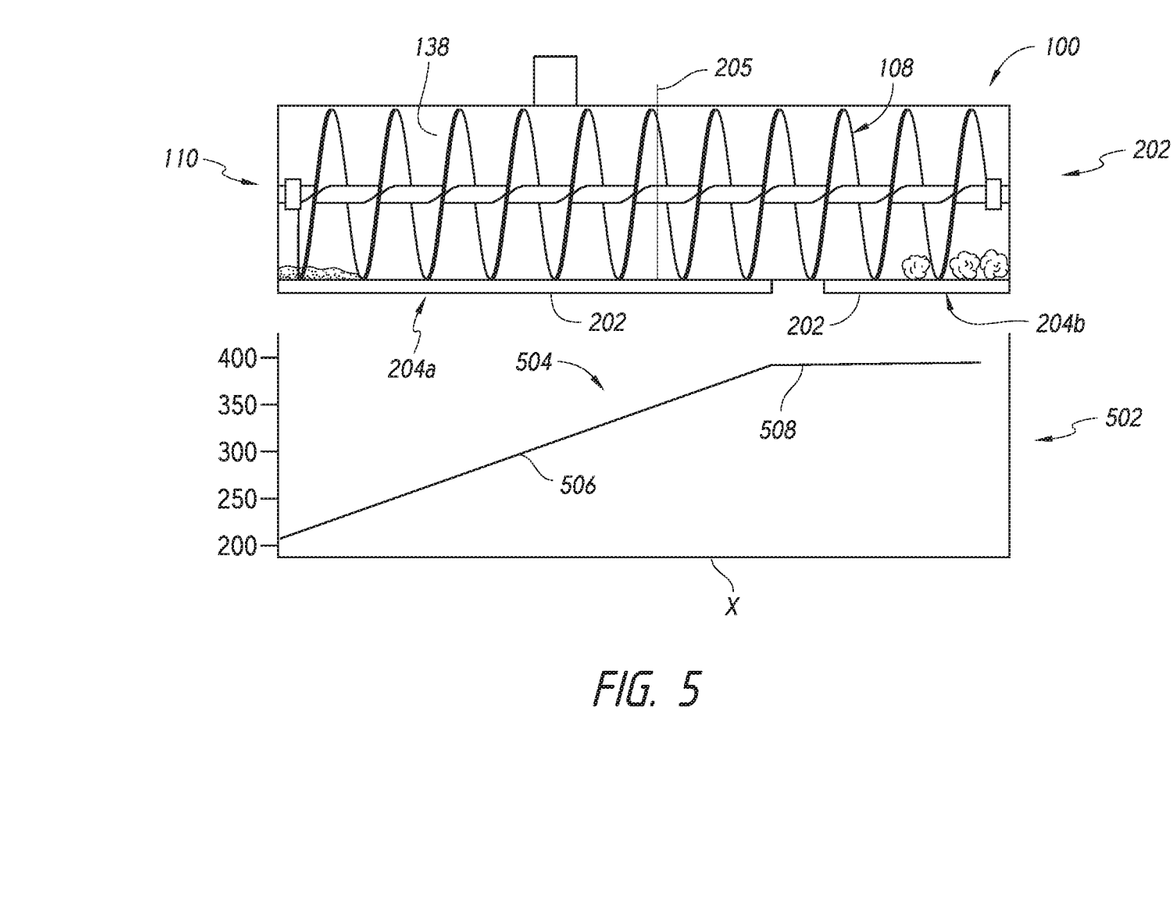
FIG. 5 is a schematic view of the popcorn machine of FIG. 1 and a graph illustrating a corresponding temperature profile.

FIG. 5 is a schematic view of the popcorn machine 100 and a graph 502 illustrating a corresponding temperature profile. In the illustrated embodiment, the graph 502 is aligned with the popcorn machine 100 and the horizontal axis X corresponds to the linear position within the process chamber 138 of the popcorn machine 100 shown above the graph 502. The graph 502 includes an idealized temperature profile 504 having a first portion 506 corresponding to the first heating zone 204a, and a second portion 508 corresponding to the second heating zone 204b. The first portion 506 includes a substantially linear profile that corresponds to a steadily rising temperature along the first heating zone 204a from the first end 110 of the popcorn machine 100, past the midpoint 205, and to the beginning of the second heating zone 204b. The second portion 508 includes a relatively flat profile that corresponds to a steady temperature throughout the second heating zone 204b. In addition to representing the linear position within the process chamber 138, the horizontal axis X of the graph 502 also corresponds to cooking time. Specifically, in several embodiments the auger 108 can rotate at a constant speed such that the position of ingredients within the process chamber 138 is directly related to a corresponding cooking time.

To provide a temperature profile similar to that of a high output kettle, the first thermocouple 206a is positioned at or near a point in the process chamber where the ingredients reach their popping temperature of approximately 375 degrees Fahrenheit (e.g., proximate to the transition point 207). Signals from the first thermocouple 206a can be used to control the first plurality of heating elements 202a to provide an increasing temperature along the length of the first heating zone 204a, and signals from the second thermocouple 206b can be used to control the second plurality of heating elements 202b to produce a relatively constant temperature through the second heating zone 204b.

The first plurality of heating elements 202a can provide a first heating rate that is relatively constant through the first heating zone 204a. At the first end 110 of the popcorn machine 100 (i.e., at the left side of the graph 502), the slow and continual addition of ingredients depresses the temperature. As the ingredients are driven through the process chamber 138, however, the constant transfer of heat via the first plurality of heating elements 202a produces an increasing temperature profile in the first heating zone 204a (i.e., the first portion 506 of the idealized temperature profile 504). The first heating rate raises the temperature of the ingredients to approximately 375 degrees Fahrenheit at the end of the first heating zone 204a. To achieve the increasing temperature profile in the first heating zone 204a, the first plurality of heating elements 202a can be selected to provide heating rates that are matched to the flow rate of ingredients through the first heating zone 204a. For example, the first plurality of heating elements 202a can be sized to deliver heating rates that heat a particular volume of corn kernels and oil to 375 degrees Fahrenheit within the amount of time that the particular volume of ingredients travels through the first heating zone 204a. This can involve, for example, calculating a heating rate (e.g., BTU/hr or Watts) based on the masses and specific heat capacities of the ingredients. Additionally, signals from the first thermocouple 206a can be used to energize and de-energize the first plurality of heating elements 202a such that the ingredients reach the popping temperature at the end of the first heating zone 204a. More particularly, the signals from the first thermocouple 206a can be used to energize and de-energize the first plurality of heating elements 202a such that the temperature at the first thermocouple 206a is maintained at approximately 375 degrees Fahrenheit.

The second plurality of heating elements 202b can provide a second heating rate (lower than the first heating rate) that is constant through the second heating zone 204b, producing a relatively constant temperature in the second heating zone 204b (i.e., the second portion 508 of the idealized temperature profile 504). To provide a relatively constant temperature, the second plurality of heating elements 202b can be selected to provide heating rates that are matched to a rate of heat loss within the second heating zone 204b. Additionally, signals from the second thermocouple 206b can be used to match the second heating rate to the rate of heat loss. Specifically, signals from the second thermocouple 206b can be used to energize and de-energize the second plurality of heating elements 202b to maintain a relatively constant temperature of approximately 375 degrees Fahrenheit in the second heating zone 204b.

Figure 6:
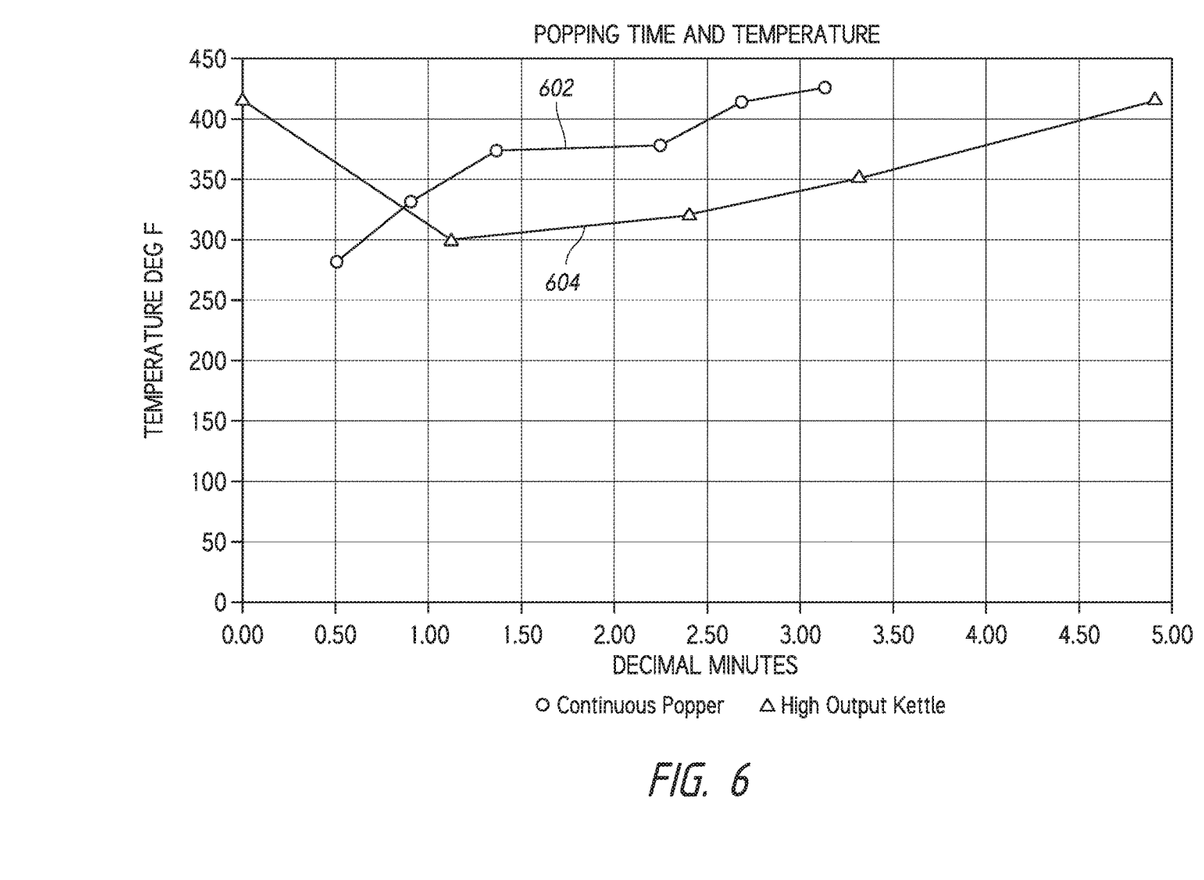
FIG. 6 is a graph illustrating a first temperature profile observed in a continuous popcorn machine configured in accordance with the present technology, and a second temperature profile observed in a high output kettle.

FIG. 6 is a graph illustrating a first temperature profile 602 observed in a continuous popcorn machine configured in accordance with the present technology (e.g., the popcorn machine 100) and a second temperature profile 604 observed in a high output kettle. As can be seen by comparing the first temperature profile 602 and the second temperature profile 604, the batch addition of corn in the high output kettle causes a significant temperature drop. In the popcorn machine 100, the slow and continual addition of ingredients keeps the temperature near the first end 110 relatively low, similar to the temperature of the high output kettle after the batch addition of ingredients. Accordingly, the high output kettle and the popcorn machine 100 both begin their popping cycles at a similar temperature (i.e., approximately 300 degrees Fahrenheit). As the ingredients are driven through the process chamber 138 of the popcorn machine 100, they are heated at a rate that is substantially similar to that of the high output kettle. In particular, after approximately one minute of cooking time, the continuous popper and the high output kettle both have relatively linear temperature profiles. In testing, operation of a continuous popcorn machine configured in accordance with the present technology has consistently produced quality popcorn that is comparable to popcorn produced in high output kettles.

In several embodiments, the popcorn machine 100 can include one or more components, devices and/or features that are at least generally similar to those described in U.S. patent application Ser. No. 12/891,722, filed Sep. 27, 2010, and entitled POPCORN MACHINES AND OTHER MACHINES HAVING REVERSIBLE FOOD MOVING DEVICES FOR POPPING POPCORN AND PRODUCING OTHER TYPES OF EXPANDED FOODS, in U.S. Pat. No. 8,201,492, filed Mar. 6, 2009, and entitled POPCORN POPPING MACHINES AND ASSOCIATED METHODS OF MANUFACTURE AND USE, and/or in U.S. patent application Ser. No. 11/942,648, filed Nov. 19, 2007, and entitled POPCORN MACHINES AND OTHER MACHINES HAVING MULTIPLE HEAT ZONE COOKING SURFACES FOR PRODUCING POPCORN AND OTHER TYPES OF EXPANDED FOODS, each of which is incorporated herein by reference in its entirety.

Figure 7:
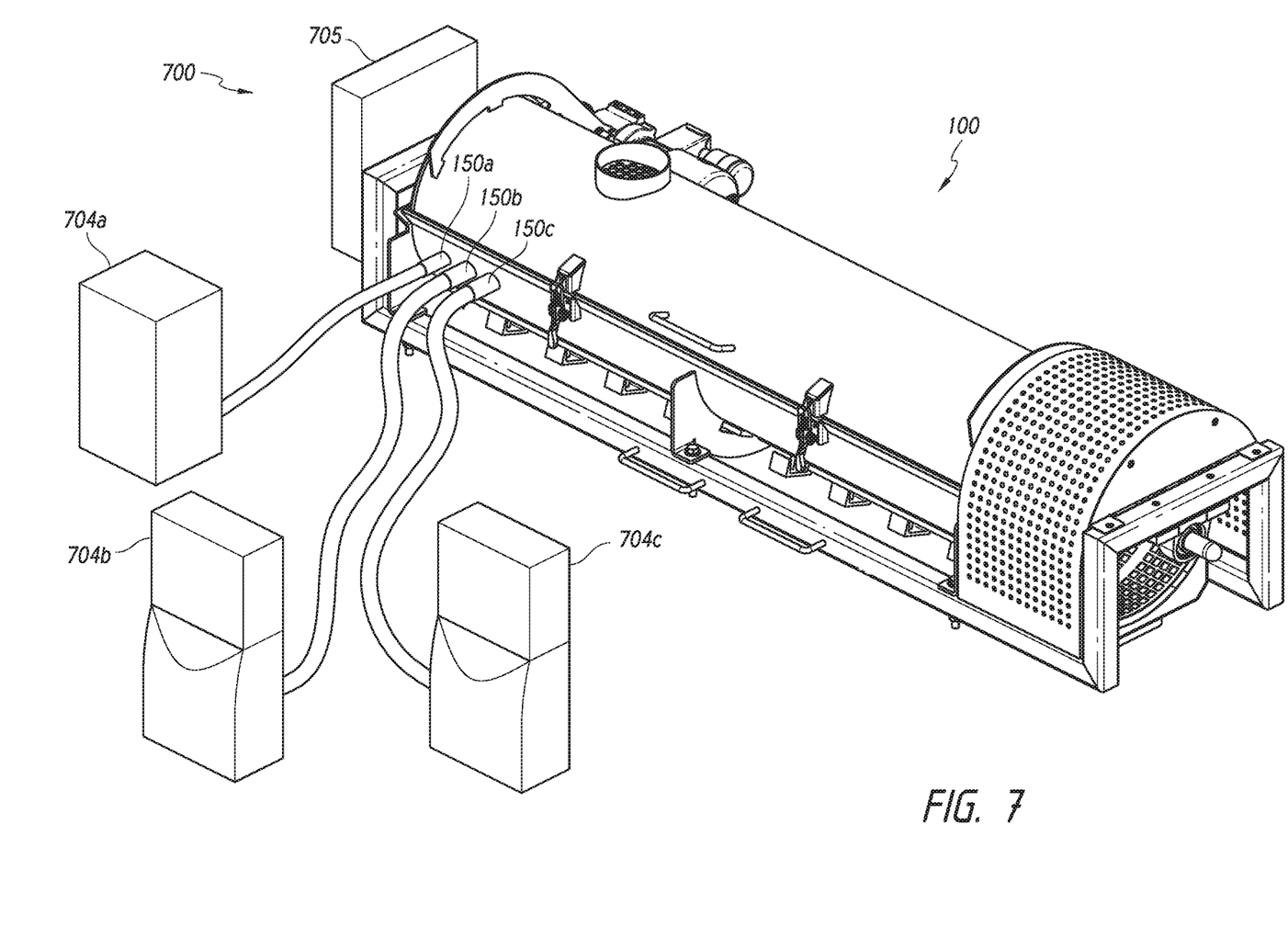
FIG. 7 is an isometric view of an industrial food production line configured in accordance with an embodiment of the present technology.

FIG. 7 is an isometric view of an industrial food production line 700 ("production line 700") configured in accordance with an embodiment of the present technology. In the illustrated embodiment, the production line 700 includes the popcorn machine 100, ingredient hoppers 704 (identified individually as a first ingredient hopper 704a, a second ingredient hopper 704b, and a third ingredient hopper 704c), and a main control panel 705. The control panel 705 can provide electrical power to and operational control of various components of the production line 700. For example, the control panel 705 can provide electrical power and/or control signals to the popcorn machine 100, the hoppers 704, and/or to components or devices connected to or operating with the popcorn machine 100 and/or the hoppers 704 (e.g., feeders, pumps, etc.).

In operation, the production line 500 can produce large volumes of popped popcorn that is salted, sweetened, and/or flavored. For example, in several embodiments, the main control panel 705 can be operated to move unpopped corn kernels, oil, sugar and/or salt from the hoppers 704 to the process chamber 138. The control panel 705 can also energize the heating elements 202, and initiate rotation of the auger 108 to heat the ingredients and move the ingredients through the process chamber 138, thereby popping and flavoring the popcorn in the manner described above with respect to FIGS. 1-4C.

In several embodiments, the control panel 705 can monitor temperatures and/or other operating parameters of the popcorn machine 100 and adjust various settings to improve the quality of the popcorn product. For example, the control panel 705 can monitor one or more temperatures via the thermocouples 206, energize or de-energize the heating elements 202, adjust the current applied to the heating elements 202, or adjust a rate of rotation of the auger 108. In some embodiments, the adjustments to the operation of the popcorn machine 100 via the control panel 705 are manually entered via an operator, in other embodiments, the adjustments can be automatically made via the control panel 705. For example, the control panel 705 can include one or more computer readable media storing instructions for operation of the popcorn machine 100 and/or the production line 500. The control panel can also include one or more processors for executing the instructions on the computer readable media, and a variety of electronic and/or electro-mechanical components for controlling operations of the popcorn machine 100 and the production line 500 (e.g., relays, programmable logic controllers, circuit boards, touch screens, etc.).

Popcorn machines configured in accordance with the present technology can include process chambers that provide for efficient and consistent production of high-quality popcorn. In prior auger-driven popcorn machines, augers are used move ingredients along troughs. The troughs have open tops, and heated air and gases readily escapes from the troughs. In contrast, the process chamber 138 includes a tubular shape that contains the heated air and steam, thereby transferring more heat to the ingredients. This additional heating can be controlled via the feedback provided by one or more thermocouples 206 to optimize the popping cycle to produce consistent high-quality popcorn. Additionally, the containment of the heat within the process chamber 138 can help reducing operating costs.

From the foregoing, it will be appreciated that specific embodiments have been described herein for purposes of illustration, but that various modifications may be made without deviating from the spirit and scope of the present technology. Those skilled in the art will recognize that numerous modifications or alterations can be made to the components or systems disclosed herein. Moreover, certain aspects of the present technology described in the context of particular embodiments may be combined or eliminated in other embodiments. Further, while advantages associated with certain embodiments have been described in the context of those embodiments, other embodiments may also exhibit such advantages, and not all embodiments need necessarily exhibit such advantages to fall within the scope of the present technology. Accordingly, the inventions are not limited except as by the appended claims.

We claim:

1. A popcorn machine, comprising:
    a tube extending along a longitudinal axis and having an upper tube portion and a lower tube portion, wherein the upper tube portion and the lower tube portion form a circumferential boundary of a tubular process chamber, and wherein the tubular process chamber includes first and second heating zones extending along the longitudinal axis;
    a first heating element positioned to heat the first heating zone;
    a second heating element positioned to heat the second heating zone;
    a first temperature sensor positioned to detect a temperature at a transition point between the first heating zone and the second heating zone;
    a second temperature sensor positioned to detect a temperature in the second heating zone;
    an auger positioned at least partially within the tube, wherein the auger is rotatable to move ingredients through the process chamber; and
    a control system operatively coupled to the first and second heating elements and the first and second temperature sensors, wherein the control system includes at least one non-transitory computer readable medium storing instructions that, when executed, cause the control system to—
        based on the temperature at the transition point, control the first heating element to provide a generally increasing temperature profile along a length of the first heating zone such that the ingredients reach a preset temperature at the end of the first heating zone; and
        based on the temperature in the second heating zone, control the second heating element to provide a generally constant temperature profile at the preset temperature along a length of the second heating zone.

2. The popcorn machine of claim 1 wherein the tube extends along the longitudinal axis from a first end to a second end, and wherein the first heating zone extends from the first end to past a midpoint of the tube.

3. The popcorn machine of claim 2 wherein the transition point is positioned between the first heating zone and the second end of the tube.

4. The popcorn machine of claim 1 wherein the second temperature sensor is positioned at a midpoint of the second heating zone.

5. The popcorn machine of claim 1 wherein the ingredients include popcorn kernels, and wherein the preset temperature is a popping temperature of the popcorn kernels.

6. The popcorn machine of claim 1 wherein the first and second heating elements are differentially positioned toward a first side of the auger to direct more heat toward the first side of the auger than a second side of the auger opposite the first side.

7. The popcorn machine of claim 6 wherein the first side of the auger is a rising side of the auger.

8. The popcorn machine of claim 1 further comprising a plurality of scrapping wires (a) extending from a shaft of the auger and toward the tube and (b) configured to exert a force against the tube.

9. A popcorn machine having a process chamber with a variable temperature along a length thereof, the popcorn machine comprising:
    a tube defining the process chamber;
    an auger positioned at least partially within the tube and rotatable to move ingredients through the process chamber;
    a first heating element positioned proximate the tube and configured to heat a first heating zone of the process chamber, whereby the first heating zone has a generally increasing temperature profile along a length thereof such that the ingredients reach a predetermined temperature at the end of the first heating zone; and
    a second heating element positioned proximate the tube and configured to heat a second heating zone of the process chamber, whereby the second heating zone has a generally constant temperature profile at the predetermined temperature along a length thereof.

10. The popcorn machine of claim 9 wherein the tube extends along a longitudinal axis, and wherein the generally increasing temperature profile increases generally linearly along the longitudinal axis in a direction toward the second heating zone.

11. The popcorn machine of claim 9 wherein the ingredients include popcorn, and further comprising a first temperature sensor positioned to detect the predetermined temperature at the end of the first heating zone, and wherein the predetermined temperature is a popping temperature of the popcorn.

12. The popcorn machine of claim 9, further comprising:
a first temperature sensor positioned to detect a temperature at a transition point between the first heating zone and the second heating zone; and
a second temperature sensor positioned to detect a temperature near a midpoint of the second heating zone.

* * * * *

UNITED STATES PATENT AND TRADEMARK OFFICE
CERTIFICATE OF CORRECTION

PATENT NO. : 10,631,562 B2
APPLICATION NO. : 15/821654
DATED : April 28, 2020
INVENTOR(S) : Charles D. Cretors et al.

It is certified that error appears in the above-identified patent and that said Letters Patent is hereby corrected as shown below:

In the Specification

In Column 5, Line 1, delete "and or" and insert -- and/or --, therefor.

In the Claims

In Column 12, Line 3, in Claim 1, delete "to—" and insert -- to --, therefor.

Signed and Sealed this
Third Day of November, 2020

Andrei Iancu
*Director of the United States Patent and Trademark Office*